Aug. 16, 1949.  S. V. CARLSTEN  2,478,894
HAND TOOL
Filed April 25, 1946
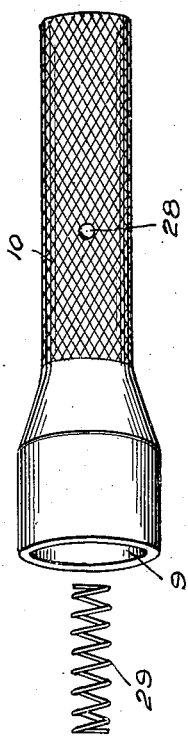
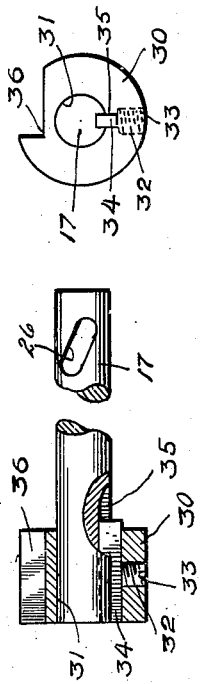
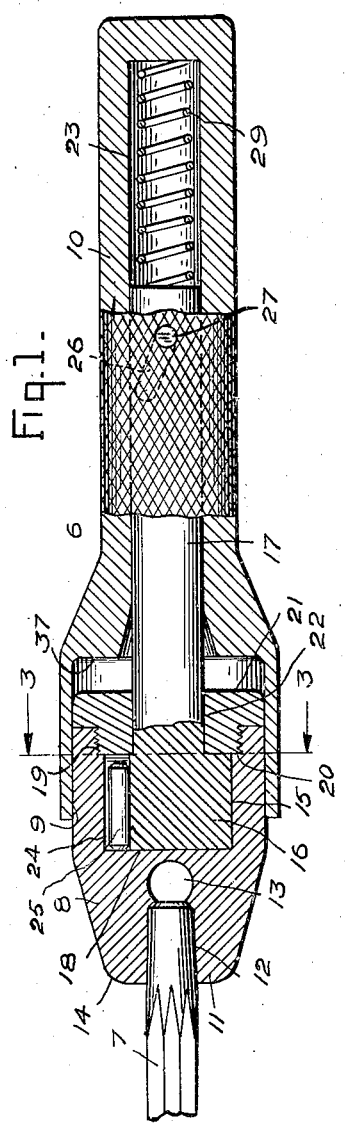
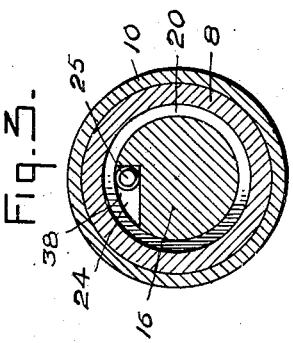
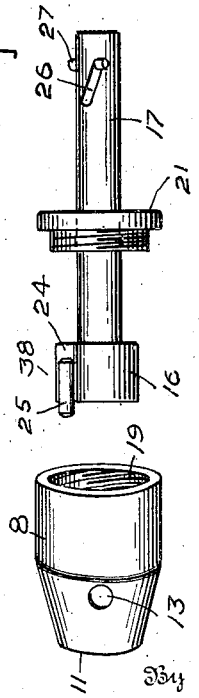
Inventor
Sigurd V. Carlsten
By J. H. Church & W. E. Thibodeau
Attorney Patented Aug. 16, 1949

2,478,894

UNITED STATES PATENT OFFICE 2,478,894

HAND TOOL

Sigurd V. Carlsten, Akron, Ohio

Application April 25, 1946, Serial No. 664,867

1 Claim. (Cl. 255—36)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to an improvement in hand tools such as one for intermittently rotating rock drills or the like when struck a blow on the end of a handle, and more particularly, the idea of turning the drill bit through the proper angle after each stroke.

In drilling holes in stone, concrete, or like materials it is necessary to rotate the drill after each stroke of the hammer since the drill used is acting as a chisel, and in order to have it perform in its proper function, that is, to cut or chip a hole in the material, it must be rotated if the cutting edges are to chip or cut off the material bit by bit. This rotation may be done by hand or mechanically. In order to obviate the necessity of hand rotation, various forms of mechanical rotating drills have been tried out, most of the methods taught however being applicable only to power driven drills. Some of these require the use of a hand operated rotation wrench in order to accomplish this function. In all known embodiments, the rotation depends largely upon the down or power stroke with its attendant shock to the mechanism or the operator, and none of the methods pointed out are readily adaptable for use in a drilling tool powered by hand where the usual practice is to secure the drill within the chuck and revolve the entire tool by hand after each stroke, a practice which not only slows up the work being done but which is also fatiguing to the operator.

The principal object of my invention is to provide a hand tool whereby a drill may be rotated mechanically by means of the up stroke of the tool.

A further object of my invention is to provide a hand tool for use with a drill whereby the chuck is rotated through a one-way clutch with a minimum of shock to the mechanism.

Another object of my invention is to provide a hand tool which may be applicable to any tool where a step-by-step rotation of a chuck is employed.

Other objects and advantages of the invention will become apparent during the course of the following specification, and the accompanying drawings, forming part of the specification, wherein like numbers are used to designate like parts.

In the drawings:

Figure 1 is a fragmentary section, partly in elevation, of the hand tool of this invention, Figure 2 is an exploded view of the same, Figure 3 is a transverse section taken on the line 3—3 of Figure 1, Figure 4 is a longitudinal section of a removable barrel for the shaft, the shaft being shown in elevation, and, Figure 5 is an end view of the same.

Referring now in details to the drawings, the numeral 6 denotes a hand tool which acts upon a drill 7 through a chuck 8 to rotate the drill. The chuck 8 is received slidably in the hollow recess of a handle 10.

The chuck 8 is generally cylindrical in shape and is tapered at one end to provide a face 11 at relatively smaller diameter than the body, and is provided with an axial bore 12 in the face end providing a socket for the drill 7, said bore being of such depth and diameter as will accommodate a standard drill. A transverse opening 13 is provided adjacent the inner end of the bore 12 to facilitate removal of the drill 7, and the edge of the face 11 adjacent the tapered side is rounded as indicated in Figure 1 at 14.

The other end of the said chuck 8 is provided with an axial bore 15 to slidably engage the barrel 16 of a shaft 17, the said barrel 16 being formed integral with the shaft 17. The bottom of the said bore 15 provides a striking surface 18 for transmitting the impact force of the shaft 17. A threaded portion 19 backed by a shoulder 20 is provided to permit a nut 21, having an axial opening 22 therethrough for passage of the shaft 17, and serving as a guide for the barrel 16, to be securely threaded into the chuck.

The handle 10 is generally cylindrical in cross section, and is bored at one end to provide the hollow recess 9 in which the chuck 8 and the nut 21 are slidably engaged. An axially bored recess 23 of slightly larger diameter than the shaft 17 to slidably engage the said shaft 17, and in which the said shaft 17 reciprocates, communicates with the recess 9 and extends longitudinally of the said handle to a point near the other end thereof, the said other end being closed. The outer diameter of the handle is reduced beyond the recess 9 for convenient gripping within the hand of the operator, its outer surface being knurled to provide a secure grip.

The barrel 16 of the shaft 17 is arranged with a longitudinal cut-out portion 24 to provide housing for a roller member 25, said roller member 25 being adapted to bear against the sides of the said cut-out portion and the inner surface of the bore 15. The shaft 17 is also provided with a helical slot 26 to receive a pin 27 adapted to move longitudinally downward of said shaft 17 within the said slot 26 during the down stroke of the handle 10, the said pin being secured to the said handle 10 in oppositely opposed openings 28 in the reduced portion thereof. A helical compression spring 29 is positioned within the bore 23 in the handle 10 adjacent the closed end thereof, the said spring being seated between the termination of the said bore 23 and the end of the shaft 17.

The operation of the hand tool is as follows:

When the tool is struck upon the closed end of the handle 10, the said handle moves downward under the force of the blow and against the resistance of the spring 29 until the bottom 37 of recess 9 strikes against the nut 21 which fits securely in the chuck 8. The kinetic energy of the striking element is imparted through the said nut to the chuck 8, and in turn to the drill 7 through its association with the said chuck.

As the handle 10 moves downward under the force of the blow, the pin 27 is carried downward in the helical slot 26 by the said handle, so that as the handle moves axially downward, the shaft rotates through a limited angle in a counter clockwise direction. The roller 25, in association with the cut out portion 24, constitutes a one-way clutch 38. As the handle moves down, the shaft 17 moves counter clockwise and there is no appreciable engagement of roller 25 with the side of the bore 15. As the handle is moved upwardly, shaft 17 moves clockwise and roller 25 is crowded against the side of bore 15, thereby causing the chuck to rotate one-eighth of a turn. The drill 7 is then in proper angular position for the next stroke. With each recurring blow the drill is similarly rotated, and through this step-by-step rotation it avoids striking the same place twice in succession.

In the modification shown in Figures 4 and 5, a separate and removable barrel 30 is provided for the shaft 17 in place of the integral formed barrel 16. Barrel 30 is provided with a bore 31 to receive the shaft 17 and an internally threaded recess 32 to receive in threaded engagement a set screw 33 which bears against the key 34 adapted to be engaged in a key way formed in the shaft 17. The barrel 30 is provided with a cut-out portion 36 similar to the cut-out portion 24 in the barrel 16 to receive the roller 25. In all other respects the barrel 30 functions in cooperation with the shaft 17 and the handle 10 in the same manner as already described.

It is to be understood that the form of invention herewith shown is to be taken as a preferred example of the same, and that various modifications may be made in the combination and arrangement of parts disclosed in the drawings accompanying the invention without departing from the spirit thereof, as defined in the claim annexed hereto.

Having thus described my invention, I claim:

An automatically rotated hand rock drill of the type adapted to be struck by a hammer, comprising a tubular handle closed at one end, a shaft mounted in said handle for limited axial and rotational movement therein, a spring in said handle bearing on said shaft and compressed to continually urge said handle and shaft apart in an axial direction, a cam and follower on said shaft and handle respectively, arranged to convert limited axial relative movement of said shaft and handle into limited helical relative motion, a shoulder on the open end of said handle, a drill chuck carried by said shaft for axial movement therewith and free to rotate relative thereto, a one-way clutch between said chuck and shaft permitting relative rotation therebetween in one direction only, and a shoulder on said chuck adapted to be engaged by the shoulder on said handle after a predetermined amount of axial movement of said handle relative to said chuck and shaft.

SIGURD V. CARLSTEN.

REFERENCES CITED

The following references are of record in the file of this patent:

UNITED STATES PATENTS

| Number | Name | Date |
| --- | --- | --- |
| 490,152 | Macomber | Jan. 17, 1893 |
| 670,543 | Paulson | Mar. 26, 1901 |
| 739,440 | Oldham | Sept. 22, 1903 |
| 1,034,010 | Gilman | July 30, 1912 |
| 1,555,939 | Brisbois | Oct. 6, 1925 |
| 1,716,114 | Chapman | June 4, 1929 |
| 1,934,252 | Baker | Nov. 7, 1933 |